US012684672B2

(12) United States Patent
Huang et al.

(10) Patent No.: US 12,684,672 B2
(45) Date of Patent: Jul. 14, 2026

(54) MUSIC VISUALIZATION METHOD FOR LIGHT SHOW AND APPARATUS THEREOF

(71) Applicant: HARMAN INTERNATIONAL INDUSTRIES, INCORPORATED, Stamford, CT (US)

(72) Inventors: Rongjian Huang, Nanshan (CN); Qimin Chen, Nanshan (CN)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 63 days.

(21) Appl. No.: 18/782,597

(22) Filed: Jul. 24, 2024

(65) Prior Publication Data

US 2025/0098053 A1 Mar. 20, 2025

(30) Foreign Application Priority Data

Aug. 15, 2023 (CN) ......................... 202311028495.4

(51) Int. Cl.
*H05B 47/105* (2020.01)
*H05B 47/155* (2020.01)

(52) U.S. Cl.
CPC ......... *H05B 47/105* (2020.01); *H05B 47/155* (2020.01)

(58) Field of Classification Search
CPC .... H05B 47/105; H05B 47/155; H05B 45/20; H05B 47/165; G10H 1/0008; G10H 2220/005; G10H 2250/311; A63J 17/00; G06N 3/045; G10L 25/30; G10L 21/10
See application file for complete search history.

(56) References Cited

U.S. PATENT DOCUMENTS

2019/0090328 A1* 3/2019 Sakagami ................. A63J 5/02

FOREIGN PATENT DOCUMENTS

| | | | | |
|---|---|---|---|---|
| CN | 111601433 A | * | 8/2020 | G10L 25/63 |
| KR | 20220056032 A | * | 5/2022 | G06F 16/48 |
| KR | 102556886 B1 | * | 7/2023 | G06F 16/48 |

OTHER PUBLICATIONS

English translation of CN 111601433 A (Year: 2020).*
(Continued)

*Primary Examiner* — Daniel D Chang
(74) *Attorney, Agent, or Firm* — BROOKS KUSHMAN P.C.

(57) ABSTRACT

On the one hand, a music visualization method for light shows is provided. The method uses artificial intelligence neural network machine learning, which defines the judgment standards for multiple music modes by training. Therefore, any song can be identified as consisting of one or more music modes through a music mode detection neural network. On the other hand, a music visualization apparatus for light shows is provided. The apparatus can select different light show patterns according to different music modes by means of real-time artificial intelligence music mode detection/beat detection results, and light components arranged on the apparatus are combined with intelligent processing to achieve cool and dazzling sound and light effects. The music visualization apparatus can generate light show effects that match the intensity, severity, emotional style, etc. of the music to create an immersive and artistically appealing audio-visual effect.

23 Claims, 8 Drawing Sheets

(56) References Cited

OTHER PUBLICATIONS

English translation of KR 102556886 B1 (Year: 2023).*
English translation of KR 20220056032 A (Year: 2022).*
European Search Report dated Dec. 19, 2024 for European Patent Application No. 24190297.2, 9 pages.

* cited by examiner

MUSIC VISUALIZATION METHOD FOR LIGHT SHOW AND APPARATUS THEREOF

CROSS-REFERENCE TO RELATED APPLICATIONS

This application claims priority to CN Application Serial No. 202311028495.4 filed Aug. 15, 2023, the disclosure of which is hereby incorporated in its entirety by reference herein.

TECHNICAL FIELD

The subject matter as disclosed herein generally relates to music visualization, and more specifically to a music visualization method and a music visualization apparatus for light shows.

BACKGROUND

A light show is a form of performance that combines light art with music, performance and other elements to create a visual and auditory feast. Light shows are usually held in city squares, parks, theme parks, museums, concerts, vocal concerts and other places, and have become a novel cultural and artistic form for people to entertain and watch at night.

While light shows demonstrate the charm of human creativity and are increasingly becoming an indispensable part of the modern culture and art, they are also gradually being used in indoor and outdoor environments such as homes and small parties, bars and nightclubs, or advertising conferences. Therefore, it is expected that a more convenient method and apparatus for music visualization that can be used in real time for light shows can be provided. This music visualization method can help many commercial units and private places related to light shows, including using party speakers, accessories, fixtures and other music visualization apparatuses to perform light shows in different occasions, so as to bring users a better music visualization experience.

SUMMARY

According to one aspect of the disclosed subject matter, a music visualization method for light shows is provided. The music visualization method may include the following steps: constructing, by a music mode detection neural network unit, a music mode detection neural network; and inputting a song to be played into the trained music mode detection neural network for detection based on time intervals to detect the song as one of multiple music modes at each of the time intervals. The music visualization method may further include the steps of receiving, by a control unit, detection results of the music modes in the song to be played from the music mode detection neural network unit, and dynamically controlling light components to display at least one of multiple light show patterns correspondingly while playing the song.

According to another aspect of the disclosed subject matter, a music visualization apparatus for light shows is provided. The music visualization apparatus may include a music mode detection neural network unit. The music mode detection neural network unit is configured to construct and/or train a music mode detection neural network. A song to be played can be inputted into the music mode detection neural network for detection based on time intervals to detect the song as one of multiple music modes at each of the time intervals. The music visualization apparatus may further include a control unit, and the control unit is configured to receive a music mode of a song to be played from the music mode detection neural network unit. The music visualization apparatus may further include light components, and the light components may be or include light sources such as an LED. The light components may also be configured to be dynamically controlled by the control unit to display one of multiple light show patterns correspondingly while playing a song.

According to yet another aspect of the disclosed subject matter, a non-transitory computer-readable medium storing instructions is provided. These instructions, when executed by one or more processors, cause the one or more processors to execute the music visualization method for light shows provided by the disclosed subject matter.

BRIEF DESCRIPTION OF THE DRAWINGS

These and/or other features, aspects and advantages of the present invention will be better understood upon reading the following detailed description with reference to the accompanying drawings, where the same characters represent the same parts in these accompanying drawings.

DETAILED DESCRIPTION

The following description of various embodiments is presented for the purpose of illustration, but is not intended to be exhaustive or to limit the disclosed embodiments. Many modifications and variations will be apparent to those of ordinary skill in the art without departing from the scope and spirit of the described embodiments.

Generally speaking, the disclosed subject matter provides a music visualization method for light shows.

The music visualization method can provide detection of music modes and extract music information, such as physical information included in the music, so as to identify the music mode of each music clip according to the physical information, and then display the identified music modes by combining these music modes with the electromechanical technology. For example, by combining sound, light and electricity into a speaker unit, information such as music rhythm, style and mood can be reflected, thereby creating a light show that changes the viewing atmosphere.

Figure 1:
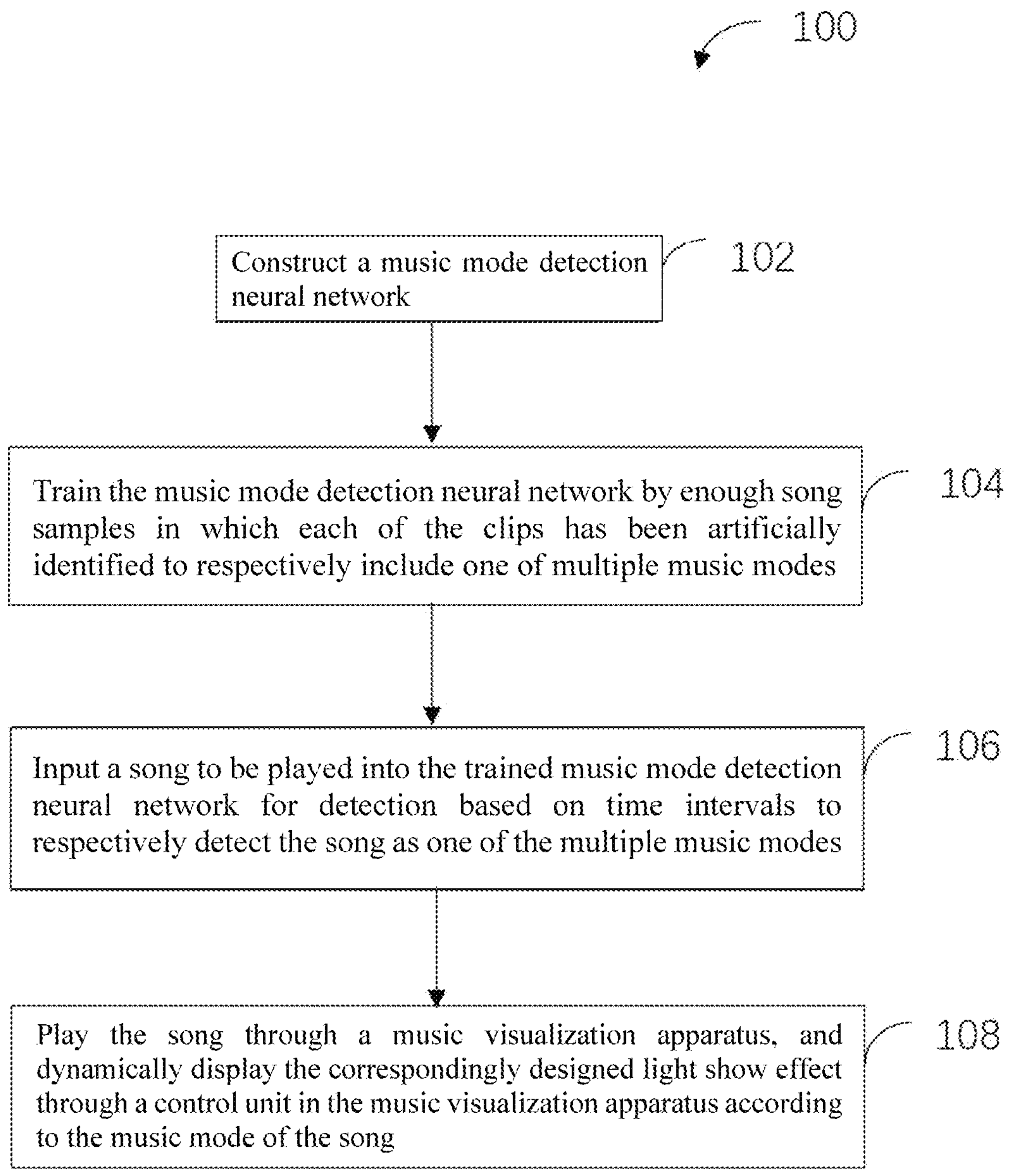
FIG. 1 shows a flow chart of a music visualization method for light shows according to one or more embodiments of the disclosed subject matter.

FIG. 1 shows a flow chart 100 of a music visualization method for light shows according to one or more embodiments of the disclosed subject matter.

In order to combine objective music measurement standards with the perceived music experience of audiences, the disclosed subject matter selects artificial intelligence neural network machine learning as a method to define the thresholds of the individual physical information of each music mode. Therefore, in the step of box 102 of the music visualization method, a dynamic neural network may be created so that the neural network can detect the music mode within each time range of the music by detecting the music mode, that is, construct a music mode detection neural network, and the music mode detection neural network can respectively determine the music as one of multiple music modes through artificial intelligence judgment.

In some examples, four music modes, for example, may be derived after analyzing different music genres. These four music modes respectively represent four levels of music intensity and excitement (from 1 to 4). For example, music modes 1 to 4 can respectively represent four excitement and intensity levels in the music from low to high. There are many physical information measurement standards in music that can be used to define the intensity and excitement of the music, including but not limited to: music speed, music intensity, variety of instrument types, timbre saturation, attack level, bass level, etc. However, intensity and excitement are abstract conclusions that draw not only on the above standards but also on the perceived music experience of real audiences and mode-level definitions.

Figure 2:
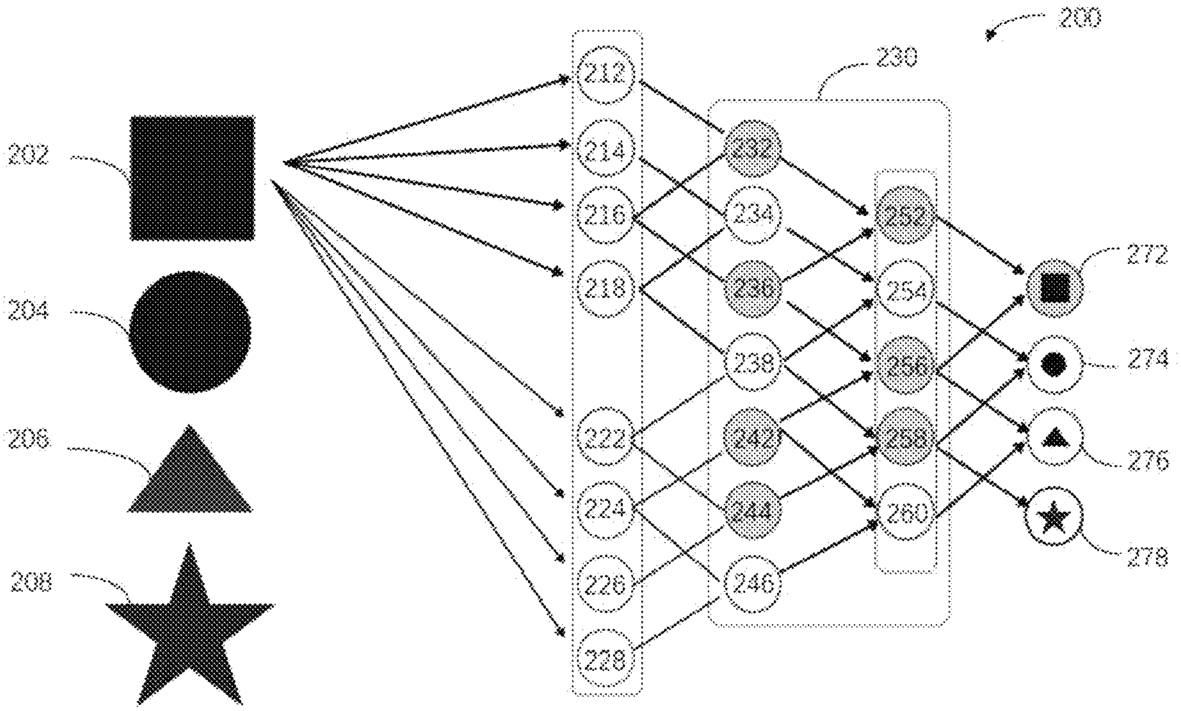
FIG. 2 shows a schematic diagram of exemplary music mode detection neural network training according to one or more embodiments of the disclosed subject matter.

FIG. 2 shows a schematic diagram of an exemplary music mode detection neural network 200 according to one or more embodiments of the disclosed subject matter. The music mode detection neural network 200 is a dynamic neural network. In one or more embodiments of the disclosed subject matter, the neural network 200 can be used to detect any song or song clip inputted thereto as one of these four music modes.

The music mode detection neural network 200 shown in FIG. 2 first detects some key music representatives of the song clip inputted from an input layer. These key music representatives may be physical information carried in some music. For example, these key music representatives may include: (1) low attack speed, (2) low attack intensity, (3) high attack speed, (4) high attack intensity, (5) bass level, (6) instrument diversity, (7) vocal speed, and (8) vocal intensity. These key music representatives are fed into a neural network for judgment, thereby detecting the music mode of the inputted song clip.

In one or more embodiments of the disclosed subject matter, the processing process of the music mode detection neural network 200 can be described as follows: the above eight music representatives of the song clip are fed from the input layer to the corresponding eight neurons 212, 214, 216, 218, 222, 224, 226, and 228 of the first layer, each of which can represent a judgment standard (threshold) for a key music representative. For example, the low attack speed is judged in the neuron 212, the low attack intensity is judged in the neuron 214, the high attack speed is judged in the neuron 216, the high attack intensity is judged in the neuron 218, the bass level is judged in the neuron 222, the instrument diversity is judged in the neuron 224, the vocal speed is judged in the neuron 226, and the vocal intensity is judged in the neuron 228. This can detect whether the key music representative corresponding to the song clip is within the threshold range.

The judgment result is added with the corresponding weight when entering the next neuron, and their sum is sent as an input to neurons in a hidden layer 230. The bias associated with each of the neurons is also added to the sum, and the output result of an activation function is then used to determine whether a specific neuron will be activated. The activated neurons are able to transmit data to the neurons of the next layer. For example, if the judgment of the neuron 212 and the judgment of the neuron 216 are met at the same time, after entering the next layer, the judgment results of the two neurons 212 and 216 are merged into the same neuron 232 of the next layer. Therefore, the neurons making judgments in the next layer are reduced to seven, corresponding to the seven neurons 232, 234, 236, 238, 242, 244, and 246 in the hidden layer 230. Then, after the judgment of this layer, the judgment standards of two of the seven neurons, for example, the neuron 232 and the neuron 236, are met at the same time. In addition, the standards of the judging neuron 238 and the judging neuron 244 are also met at the same time. When entering the next layer, the neurons 232 and 236 enter the same neuron 254, and the neurons 238 and 244 also meet the conditions and enter the same neuron 258. The neurons in this layer become five neurons 252, 254, 256, 258, and 260. It can be seen that the number of neurons entering the next layer subsequently gradually decreases, as shown in FIG. 2.

Data is transmitted through a network in such a manner, that is, forward transmitted (e.g., processed from left to right in the music mode detection neural network 200 in FIG. 2). In an output layer, the neurons with the maximum values are triggered and determined to be outputted, and these values are basically a probability value. As shown in the neural network 200 in FIG. 2, in the final output layer, the probability of judging that the song is in the music mode 1 is the highest because the standards of the five neurons 252, 254, 256, 258, and 260 are simultaneously met. Therefore, the output result of the output layer is the detection result 272, indicating that the inputted song clip is judged to belong to the music mode 1. In the example of the music mode detection neural network 200, the judgment of key representatives is reduced from 8 to 7 and then to 5. However, in other examples, the number of key representatives may be reduced to even fewer, thereby providing a combination of judgment standards for key representatives of a specific mode.

The neural network described above can detect a song clip as an input and classify the song clip into one of four music modes.

However, in order to accurately judge the music mode, the neural network may need to be trained before being put into use to gradually reduce the judgment error and increase the probability of correct judgment.

During the training process of the neural network, the output is fed to the neural network just like the input. The predicted output is compared with the actual output to obtain an error in the prediction, the size of the error indicates the degree of an error, and a predicted value is higher than or lower than an expected value. Then, the predicted value information is backward transmitted through the neural network (e.g., processed from right to left in the music mode detection neural network 200 in FIG. 2), forward transmission and backward transmission are iteratively performed through multiple inputs, and the weights are adjusted simultaneously until the assigned weights enable the neural network to correctly predict the music mode.

The method of the disclosed subject matter employs song samples in which the music mode of each clip has been artificially identified for training the neural network. These song samples may be songs belonging to different styles or genres, such as but not limited to Electronic Dance Music (EDM), Rock, Jazz, Dubstep, Techno, R&B, Country Music, and Pop Music.

In the step of box 104 of the music visualization method provided in the disclosed subject matter, enough such song samples are selected to train the music mode detection neural network. Each of the clips of these song samples has been artificially identified to indicate which of the four music modes it belongs to.

Listed below are three groups of sample sets of exemplary soundtrack clips and music modes thereof. In this example, the first group of soundtrack ST1, the second group of soundtrack ST2, and the third group of soundtrack ST3 are respectively derived from three song samples of different styles. The first group of soundtrack ST1 includes a sample set of each of the clips from the first song and modes 1 to 4 thereof, the second group of soundtrack ST1 includes a sample set of each of the clips from the second song and modes 1 to 4 thereof, and the third group of soundtrack ST1 includes a sample set of each of the clips from the third song and modes 1 to 4 thereof. From the examples of the three groups of sample sets, it can be seen that the music mode of each of the clips of the three songs has been identified, and the time range corresponding to each of the clips has been recorded according to different modes (modes 1 to 4).

| Soundtrack ST1: | Soundtrack ST2: | Soundtrack ST3: |
|---|---|---|
| Mode 3 --- 1 s-10 s | Mode 2 --- 1 s-32 s | Mode 2 --- 1 s-16 s |
| Mode 4 --- 10 s-21 s | Mode 1 --- 33 s-40 s | Mode 3 --- 17 s-28 s |
| Mode 2 --- 22 s-31 s | Mode 2 --- 40 s-46 s | Mode 1 --- 29 s-31 s |
| Mode 1 --- 31 s-33 s | Mode 3 --- 47 s-1:18 s | Mode 3 --- 32 s-47 s |
| Mode 2 --- 34 s-38 s | Mode 2 --- 1:19 s-1:48 s | Mode 4 --- 48 s-54 s |
| | Mode 3 --- 1:49 s-2:04 s | Mode 3 --- 55 s-1:03 s |
| | Mode 4 --- 2:05 s-2:12 s | Mode 1 --- 1:04 s-1:17 s |
| | Mode 3 --- 2:12 s-2:18 s | Mode 2 --- 1:18 s-1:30 s |
| | Mode 2 --- 2:19 s-2:34 s | Mode 1 --- 1:31 s-1:33 s |
| | Mode 4 --- 2:35 s-2:43 s | Mode 3 --- 1:34 s-1:48 s |
| | Mode 3 --- 2:44 s-3:05 s | Mode 4 --- 1:49 s-1:55 s |
| | Mode 2 --- 3:05 s-3:18 s | Mode 3 --- 1:56 s-2:01 s |
| | Mode 1 --- 3:19 s-End | Mode 2 --- 2:02 s-2:05 s |
| | | Mode 1 --- 2:06 s-End |

As shown in the music mode detection neural network 200 in FIG. 2, in a training example for the music mode 1, the clip identified as the mode 1 can be inputted into an input module 202 of the mode 1 of the music mode detection neural network 200, for example, the song clip identified as the mode 1 in the soundtrack ST1 can be used as a training sample for the mode 1 from 31 s to 33 s. In addition, from the three groups of soundtracks ST1, ST2, and ST3 given above, it can be seen that the clips 33*s*-40*s* and 3:19*s*-End in the soundtrack ST2 and the clips 29*s*-31*s*, 1:04*s*-1:17*s*, 1:31*s*-1:33*s* and 2:06*s*-End in the soundtrack ST3 are also song clips belonging to the mode 1, which can also be inputted into the input module 202 of the mode 1 of the music mode neural network for iterative training of the mode 1. In some other examples, the clips identified as the mode 1 in other song samples can also be inputted into the input module 202 of the mode 1 of the music mode detection neural network to train the mode 1 for more iterations, and the input predictions of these samples in the mode 1 all should be judged as the detection output 272 of the mode 1. The output 272 is used as an input again and backward transmitted by the music mode detection neural network 200. In this way, by using enough song samples for training, a standard range combination for the mode 1 is obtained.

Similarly, for the training of the training mode 2 in the music mode detection neural network, the clips identified as the mode 2 in the soundtracks ST1, ST2, and ST3 can be selected as song clips in the mode 2 and inputted into an input module 204 of the mode 2 of the neural network, and the output 274 at the output layer can be backward transmitted as an input. For example, the clips of 21*s*-31*s* and 31*s*-48*s* in the soundtrack ST1, the clips of 1 s-32 s, 40 s-46 s, 1:19 s-1:48 s, 2:19 s-2:34 s and 3:05 s-3:18 s in the soundtrack ST2, and the clips of 1 s-16 s, 1:18 s-1:30 s and 2:02 s-2:05 s in the soundtrack ST3 are also song clips identified as the mode 2, which can also be inputted into the input module 204 of the mode 2 of the music mode detection neural network for iterative training of the mode 2. Similarly, the clips identified as the mode 2 in other song samples can also be inputted into the input module 204 of the mode 2 of the music mode detection neural network to train the mode 2 for more iterations. Therefore, key music representatives for the music mode 2 are trained in the music mode detection neural network 200, and a standard range combination of the mode 2 is provided to a machine (not shown in FIG. 2).

According to the above description of the training of the mode 1 and the mode 2, it is conceivable that the clips identified as the mode 3 in the soundtracks ST1, ST2, and ST3 and/or the clips identified as the mode 3 in other song samples can be inputted into an input module 206 of the mode 3 of the music mode detection neural network 200, and the output 276 can be used as an input to re-enter the music mode detection neural network 200 for backward transmission to train the mode 3 for multiple iterations; and the clips identified as the mode 4 in the soundtracks ST1, ST2, and ST3 and/or the clips identified as the mode 4 in other song samples can also be inputted into an input module 208 of the mode 4 of the music mode detection neural network 200, and the output 278 can be inputted into the music mode detection neural network 200 again for backward transmission to train the mode 4 for multiple iterations.

In one or more embodiments of the disclosed subject matter, as sound and light show designers input hundreds of songs identified as different music modes (modes 1 to 4) in each time range into the neural network 200 for training, a machine learning program can obtain a threshold for a corresponding key music representative of each music mode (modes 1 to 4) based on the training of the hundreds of songs, i.e., a combination mechanism of music mode measurement standards, which can cover most music cases and can "identify" music modes in the songs in a more perceptual manner.

By loading the trained music mode detection neural network onto a platform of a unit, it is possible to use such method for detecting music modes by an artificial intelligence neural network, thereby intelligently detecting the various music modes and beats of the song to be played. In the description of the disclosed subject matter here, the detection of four music modes is taken as an example, but it is conceivable that different music genres can also derive more music modes, and the method based on the disclosed subject matter can also obtain more measurement standards to define more modes of music intensity and/or excitement level, etc., thereby further enriching the perceived music experience of real audiences and mode-level definitions.

Thereafter, in the step of box 106 as shown in FIG. 1, any song to be played can be inputted into the trained music mode detection neural network 200 for detection, so as to respectively determine which of the multiple music modes each clip of the song belongs to. The music mode detection neural network 200 can detect the music mode of a song in real time based on a certain time interval. For example, the music mode detection neural network 200 can respectively detect and update the music mode of a song every 1 second based on a frequency with a time interval of 1 second. A time interval or multiple consecutive time intervals in which the output result of the music mode detection neural network 200 is the same music mode can be recorded as a song clip of the song belonging to the music mode. It is conceivable that a song may have one or more song clips recorded as the same music mode.

In one or more embodiments of the disclosed subject matter, the music mode detection neural network 200 can be used to detect and record the music mode of each of the clips of the song before playing the song, and then, different light show patterns can be displayed during the performance of light shows according to the change in the music mode.

In one or more embodiments of the disclosed subject matter, the music mode detection neural network 200 can be used to detect and output each of the music modes of the composed song clips in real time while the song is played. For example, the music mode detection neural network can detect the music mode of a song based on a time interval. For example, the music mode detection neural network can judge the music mode every second of the song and output the detection results in real time, so that the pattern of the light show can be dynamically updated while the song is played. Moreover, in this way, it is expected to provide a robust framework to achieve the real-time light show design according to multiple music modes of the song.

In the design of the light show, the beats of the music can be obtained by extracting multiple peaks of loudness from low-frequency and mid-frequency sounds. The strength of these beats can depend on the size of the corresponding peak, namely the intensity of the beats, and the beats with high intensity can be detected as heavy beats of the music. However, a light show that can only flash/breathe with every beat is still not intelligent enough for audiences. For a variety of party speaker categories, consumers may be looking for some kind of light show speaker with intelligent music mode detection, but that's not currently on the market.

Another aspect of the disclosed subject matter further provides a music visualization apparatus for light shows. The music visualization apparatus can achieve intelligent light show performances according to artificial intelligence music mode detection/beat detection. The music visualization apparatus may include a control unit which is configured to receive a detection result of a music mode of a clip of a song to be played from the music mode detection neural network. The control unit is also configured to design a corresponding light show pattern according to the music mode of the clip of the song to be played. Moreover, the control unit can also be configured to control light components, for example, to control light components to display a variety of light show patterns of different colors, brightness or flashing frequencies according to the music mode of the song and the change thereof.

Figure 3:
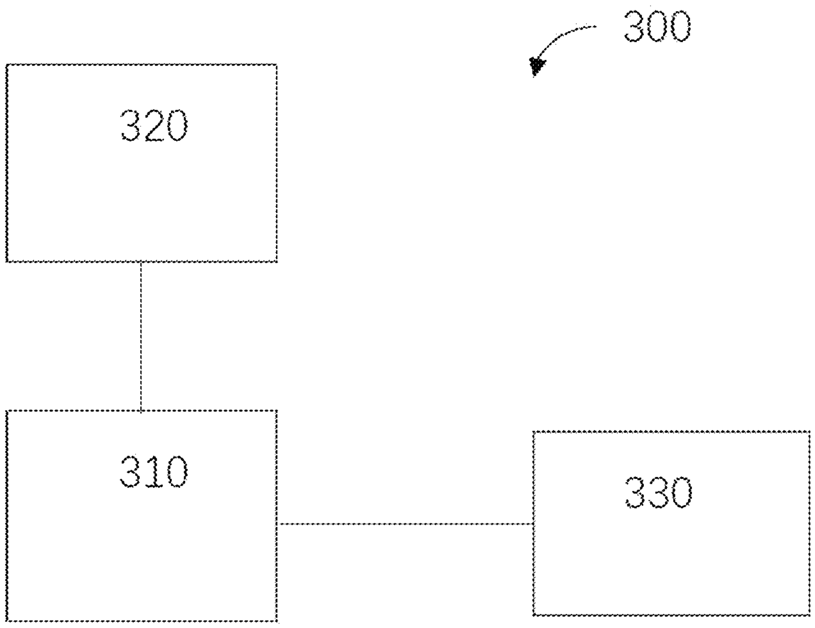
FIG. 3 shows a structural block diagram of a music visualization apparatus for light shows according to one or more embodiments of the disclosed subject matter.

FIG. 3 shows a structural block diagram of a music visualization apparatus 300 for light shows according to one or more embodiments of the disclosed subject matter. The music visualization apparatus 300 may include a control unit 310. The control unit 310 can be configured to receive detection results of music modes from the music mode detection neural network unit 320, and design various light show patterns according to these detection results. For example, the music mode detection neural network unit 320 can be implemented as a module of the control unit 310. The control unit 310 can be configured to map the output of the music mode detection neural network unit 320 to the light components, thereby displaying a light show with music meaning. For example, the control unit 310 can map the detection results (modes 1 to 4) outputted by the music mode detection neural network unit 320 into various light show patterns separately or in combination. For example, a software application App can be embedded in the control unit 310 to design, modify and change light show patterns and/or light actions therein. The control unit 310 can be configured to control one or more light components 330 to present these light show patterns, thereby performing light shows. The control unit 310 can be coupled to the one or more light components through one or more connecting cables. In one or more examples, the control unit 310 can be electrically coupled to the one or more light components 330 through a printed circuit board, and can control the light components 330 to display different light actions. In some examples, the music mode detection neural network unit 320 can be configured to achieve various operations of the music mode detection neural network. In some examples, the light components 330 may be or include light sources such as an LED light source. In some examples, the control unit 310 may be one or more processors welded to a printed circuit board. The one or more processors may be any technically feasible hardware unit configured to process data and execute software applications, including but not limited to a central processing unit (CPU), a microcontroller unit (MCU), an application specific integrated circuit (ASIC), a digital signal processor (DSP) chip, etc.

The disclosed subject matter further provides a non-temporary computer-readable medium 340 storing instructions. The instructions, when executed by the above one or more processors, cause the one or more processors to execute the music visualization method for light shows provided by the disclosed subject matter. In some examples, the one or more processors can be combined into the control unit 310 or can be arranged separately from the control unit 310.

The music visualization apparatus for light shows provided by the disclosed subject matter may be or include, for example, a speaker box equipped with light components, a portable speaker, a multimedia sound system, etc. Cool and dazzling sound and light effects can be achieved by combining the arranged light components with intelligent processing such as the App in the control unit. These light components can be arranged on a housing of the music visualization apparatus and present various shapes and forms, such as strips, rings and/or dots. These light components may be or include light sources such as LEDs, whose colors, brightness and switches are all respectively controllable and variable. Different light effects can be designed according to different music modes, for example, different music modes can be mapped to dynamic changes of at least one light show pattern. The music visualization apparatus can generate light effects that match the intensity, severity, emotional style, etc. of the music, allowing the light and shadow to dance with the music to create an immersive and artistically appealing audio-visual effect, thereby enhancing the atmosphere of family parties.

Therefore, as described in the step of box 108 in FIG. 1, the song to be played can be played through the music visualization apparatus, so that a variety of light show effects can be dynamically displayed according to one or more music modes of the song determined in real time by the music mode detection neural network through the control unit.

In one or more embodiments of the disclosed subject matter, the music mode detection neural network is a dynamic neural network. For example, before a light show, the music mode detection neural network can be used to detect, output and record the music mode of each of the clips of the song. Then, during the light show, the control unit can dynamically control the change of various corresponding light show patterns based on the music mode of each of the clips of the song. For example, a song is detected by the music mode detection neural network, and is recorded as the music mode 1 at the time period of 1 s-8 s, the music mode 2 at the time period of 9 s-29 s, also the music mode 1 at the time period of 30 s-60 s, etc. Then, when the light show of this song is performed, the light show pattern of the corresponding mode will be changed to display at the 9th second and the 30th second of the song.

In one or more embodiments of the disclosed subject matter, for example, while playing a song, the control unit can also control the light components while the music mode detection neural network unit outputs the detection results of music modes in real time to dynamically achieve an intelligent light show according to artificial intelligence music mode detection/beat detection. For example, the control unit can receive the music mode of a song detected by the music mode detection neural network unit in real time and synchronously update the light show pattern. For example, the control unit can receive the detection result of the music mode detection neural network once and synchronously update (or not update) the pattern of the light show based on the output of the music mode detection neural network every 1 second. For example, if a song is detected as the music mode 1 in the previous second and detected as the music mode 3 in the later second, the light show pattern corresponding to the music mode 1 can be synchronously changed to a light show pattern corresponding to the music mode 3 when the later second arrives. For another example, if a song is detected as the music mode 3 in the previous second and still detected as the music mode 3 in the later second, the light show pattern can be changed or not changed in the later second.

In some examples, the control unit can also update the pattern of the light show asynchronously by receiving the detection results of the music mode detection neural network. For example, the control unit can set a maximum duration threshold for a specific music mode. For example, when the playing song continues in the previous music mode for more than a certain duration, the control unit will automatically update or switch the light show pattern even if the continuously updated detection result of the music mode does not change. The duration may be set to a threshold such as 15 seconds.

Figure 4A:
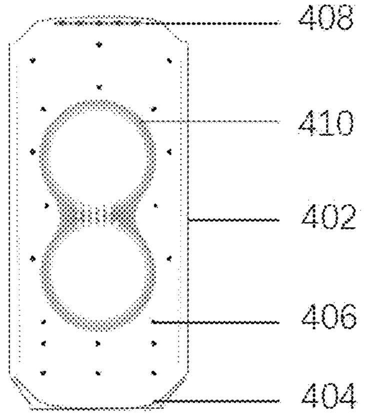
FIG. 4A shows a front view of a music visualization apparatus for light shows according to one or more embodiments of the disclosed subject matter.

FIG. 4A shows a front view of a music visualization apparatus for light shows according to one or more embodiments of the disclosed subject matter. The front view of the music visualization apparatus shows that a front panel has a vertical rectangle with shorter upper and lower sides and longer left and right sides. Strip-shaped side light strips 402 are longitudinally arranged on the left and right sides of the rectangular front panel respectively, and are respectively overlapped with the left and right sides of the front panel. A part of an edge light strip 404 arranged along the upper and lower edges of the housing of the music visualization apparatus is arranged at the upper and lower edges. In addition, multiple star-shaped light sources 406 are sparsely arranged on the front panel of the music visualization apparatus and are dispersed in a dotted manner, and these star-shaped light sources 406 are embedded in the front panel. In addition, a strip-shaped strobe light strip 408 is also transversely arranged in a part of the edge light strip 404 at the upper part of the front panel. In some examples, the strobe light strip 408 can be provided with multiple LED light sources therein, so that the strobe light strip 408 can emit strong light and form flashes.

In one or more embodiments of the disclosed subject matter, the middle part of the rectangular panel on the front of the music visualization apparatus can be configured to have an 8-shaped light strip 410 composed of two ring structures. In some examples, the upper and lower circular rings of the 8-shaped light strip 410 can be respectively arranged to surround the circular outer edges of the upper and lower speakers arranged on the front panel of the music visualization apparatus, so that when the 8-shaped light strip is illuminated, the speaker installed therein can be illuminated. In some examples, the 8-shaped light strip 410 can be configured to employ dual spotlight light components that include, for example, halogen lamps or LED lamp beads. This unique lighting design that can illuminate a spotlight effect can provide audiences with an enhanced visual experience during the light show, while prompting audiences to identify the source of power in the sound.

Figure 4B:
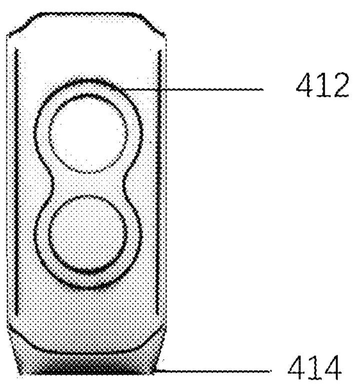
FIG. 4B shows another front view of a music visualization apparatus for light shows according to one or more embodiments of the disclosed subject matter.

FIG. 4B shows another front view of a music visualization apparatus for light shows according to one or more embodiments of the disclosed subject matter. Different from the 8-shaped light strip arranged in the middle part in FIG. 4A, the middle part of the rectangular panel on the front of the music visualization apparatus shown in FIG. 4B is arranged so that the 8-shaped inner and outer edges are arranged as a light strip reflecting an outline thereof, which is referred to as an 8-shaped outline light strip.

Figure 5:
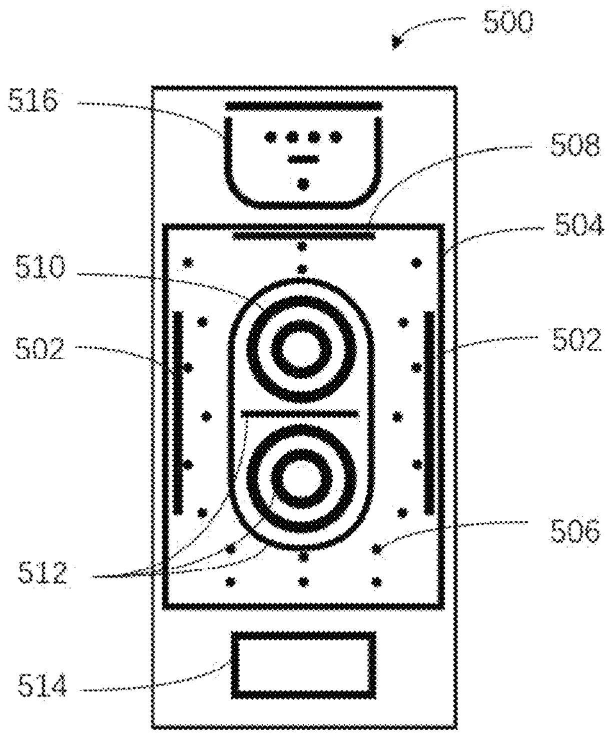
FIG. 5 shows a schematic diagram of a mapping pattern 500 of a light component according to one or more embodiments of the disclosed subject matter.

As can be seen from FIG. 4B, the bottom of the housing of the music visualization apparatus can also emit light. It is conceivable that a light component that emits light downward, namely a projection light strip 414, is also arranged on a bottom panel of the apparatus. In some examples, the projection light strip 414 that emits light downward can project light downward onto, for example, a plane below (such as a tabletop or floor). The shape of the projection light strip 414 may be, for example, a simple rectangle, as shown in the shape mapped in FIG. 5 below. In some other examples, the projection light strip 414 may also have other shapes and designs. Correspondingly, a top panel light component (not shown) may be correspondingly arranged on a top panel of the music visualization apparatus, and an example of the arrangement may also be referred to as shown in FIG. 5 below. In some examples, the top panel light component can project light upward onto, for example, a plane above (such as a ceiling).

Figure 4C:
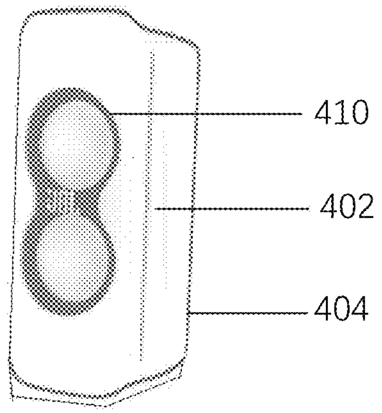
FIG. 4C shows a three-dimensional view of a music visualization apparatus for light shows according to one or more embodiments of the disclosed subject matter.

FIG. 4C shows a three-dimensional view of a music visualization apparatus for light shows according to one or more embodiments of the disclosed subject matter. The three-dimensional view shows a part of the front panel and the right-side panel. Corresponding to FIG. 4A, the 8-shaped light strip 410 on the front and the side light strip 402 on the right can be seen. In addition, it can be seen that the edge light strip 404, in addition to being arranged at the upper and lower edges of the front panel, also continues to extend at the upper and lower edges of the side panel and the rear edge, forming a closed strip-shaped lamp strip.

Figure 4D:
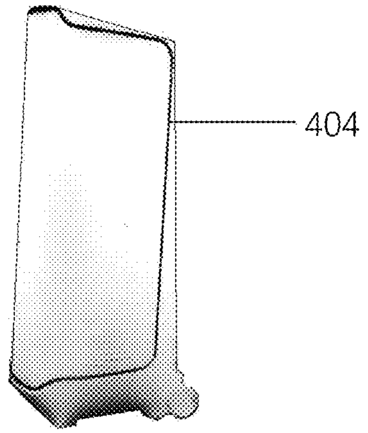
FIG. 4D shows a side view of a music visualization apparatus for light shows according to one or more embodiments of the disclosed subject matter.

FIG. 4D shows a side view of a music visualization apparatus for light shows according to one or more embodiments of the disclosed subject matter. Corresponding to FIG. 4D, the arrangement of the other side not shown here can be envisioned. Therefore, it can be more clearly seen and envisioned from FIG. 4D that the edge light strip 404 may be a closed strip-shaped light strip that extends continuously along the upper and lower edges of the rectangular front side, the upper and lower edges of the left and right sides, and the rear edge of the housing of the music visualization apparatus.

The light components of various shapes described above may be or include light components such as LEDs, whose colors, brightness and switches are all respectively controllable and changeable. Although each light strip described herein is designed according to, for example, a speaker unit having a vertical rectangular housing, various light strips with other arrangements may also be designed according to music visualization apparatuses having other shapes without departing from the scope of the disclosed subject matter.

FIG. 5 shows a schematic diagram of a mapping pattern 500 of a light component according to one or more embodiments of the disclosed subject matter. The LED mapping pattern 500 is formed by mapping various light strip patterns composed of the light components described above onto the plane in FIG. 5. Corresponding to FIG. 4A to FIG. 4D, FIG. 5 shows various light elements mapped by light components and/or light strips of various shapes, including, for example: side elements 502, edge elements 504, star elements 506, strobe elements 508, 8-shaped elements 510, 8-shaped outline elements 512, projection elements 514, and top panel elements 516. Among these light elements, the projection element 514 corresponds to the light component arranged on the bottom panel (such as the projection light strip 414 in FIG. 4B). The top panel element 516 corresponds to the light component arranged on the top panel.

Among these light elements, for example, a transverse line-shaped light element can also be arranged between the upper and lower circular rings of the 8-shaped element, which connects the upper and lower circular rings to form an 8 shape, and the upper circular ring, transverse line and lower circular ring contained in the 8-shaped element can be illuminated respectively, thereby increasing the diversity of the change effects of the 8-shaped element. In addition, the 8-shaped outline element is similar to the 8-shaped element, and the circular rings arranged along the upper and lower inner edges of the 8-shaped outline element can be designed, for example, to surround the inner edges of the circular surfaces of the upper and lower speakers on the front panel of the music visualization apparatus, where the closed outer outline outside the two smaller circular rings and formed along the outer edge of the 8-shaped element can be used to arrange the light components to form an ellipse as shown in FIG. 5, so that the outer outline, upper circular ring and lower circular ring contained in the 8-shaped outline element can also separately from different change effects of the 8-shaped outline element.

Next, the projection element 514 and the top panel element 516 respectively arranged on the bottom panel and the top panel of the music visualization apparatus may have, for example, mapping shapes as respectively shown in FIG. 5. The top panel elements 516 can be arranged to correspond to, for example, various buttons or display areas on the top panel of the apparatus. Correspondingly, the projection elements 514 arranged on the bottom panel can be arranged to, for example, dynamically project various patterns or elements to a floor to increase the interest of light shows, or can be used for commercial purposes of light shows in some occasions.

FIG. 6A to FIG. 6B, FIG. 7, FIG. 8A to FIG. 8C, FIG. 9A to FIG. 9B, FIG. 10A to FIG. 10B, FIG. 11A to FIG. 11B and FIG. 12A to FIG. 12C respectively show schematic diagrams of various light action designs for some light elements according to one or more embodiments of the disclosed subject matter. Referring to FIG. 3 described above, the control unit can be configured to control one or more light components arranged on the music visualization apparatus according to designed light show patterns, for example, control the color, brightness and/or switch of one or more LEDs to achieve changes in various light actions.

Figure 6A:
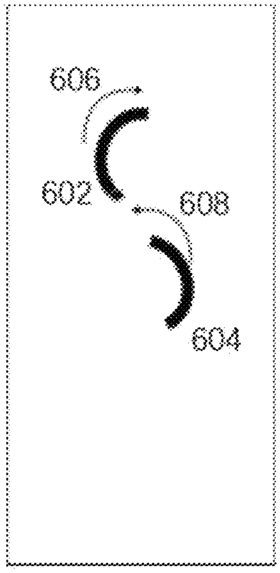
FIG. 6A to FIG. 6B show schematic diagrams of designing a light element to achieve a light action of a windshield wiper-style swing according to one or more embodiments of the disclosed subject matter.
Figure 6B:
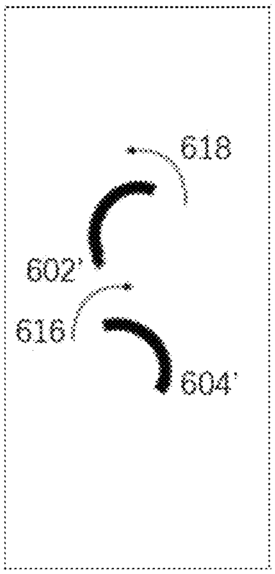

In one or more examples, light elements can be designed to achieve light actions such as a windshield wiper-style swing. For example, as shown in two frames shown successively in FIG. 6A and FIG. 6B, a part of an upper circular ring 602 and a part of a lower circular ring 604 of the 8-shaped element swing left and right in opposite directions, and can change directions simultaneously when the beat arrives. For example, in the first frame shown in FIG. 6A, the upper circular ring 602 first streaks from left to right as indicated by an arrow 606, and the lower circular ring 604 first streaks from right to left as indicated by an arrow 608. As the next beat arrives, as shown in FIG. 6B, the upper and lower circular rings simultaneously change to the second frame, and the light that has swept past returns, that is, an upper circular ring 602' changes to streaking from right to left as indicated by an arrow 618, and at the same time, a lower circular ring 604' changes to streaking from left to right as indicated by an arrow 616. The actions of the two frames are displayed in this reciprocating manner, making the action of the light look like a windshield wiper swinging left and right on a windshield of a vehicle, thereby creating an action effect of a windshield wiper-style swing.

Figure 7:
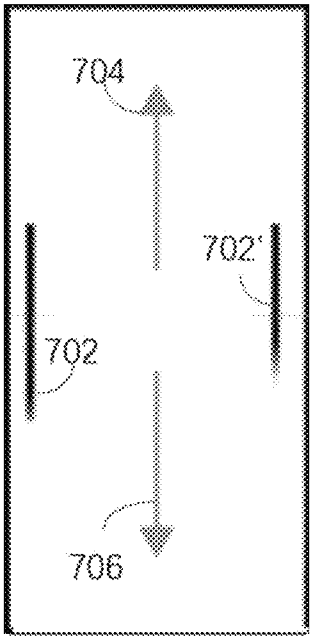
FIG. 7, FIG. 8A to FIG. 8C, FIG. 9A to FIG. 9B, and FIG. 10A to FIG. 10B respectively show schematic diagrams of designing a light element to achieve a light action of a longitudinal and/or transverse motion according to one or more embodiments of the disclosed subject matter.
Figures 8A, 8B, 8C:
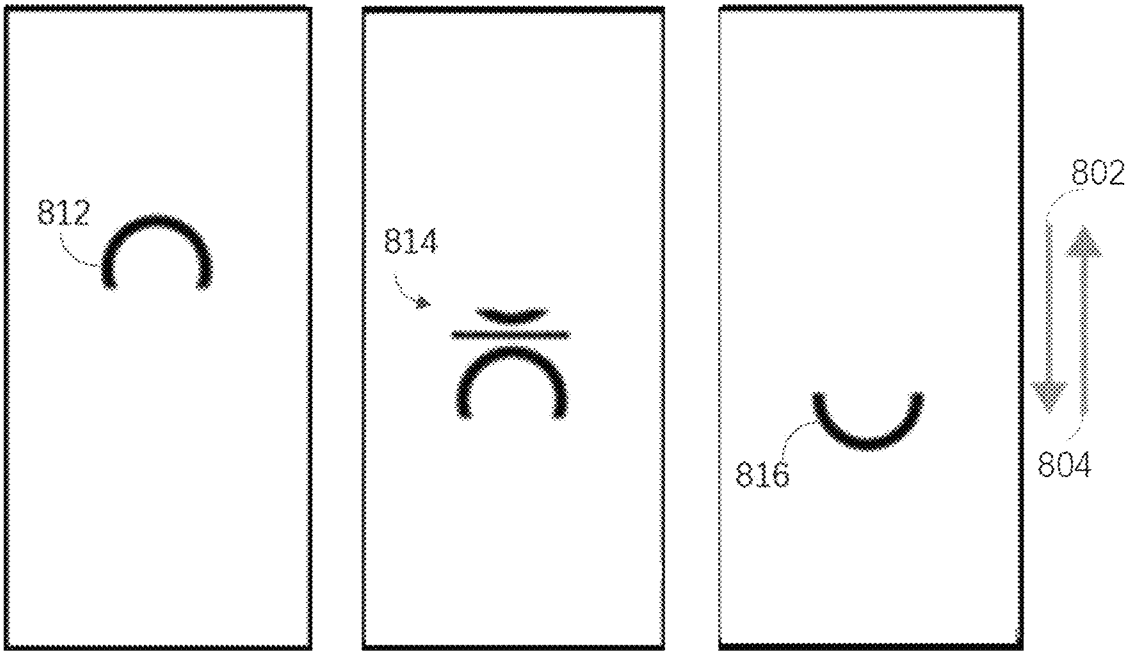
Figure 9A:
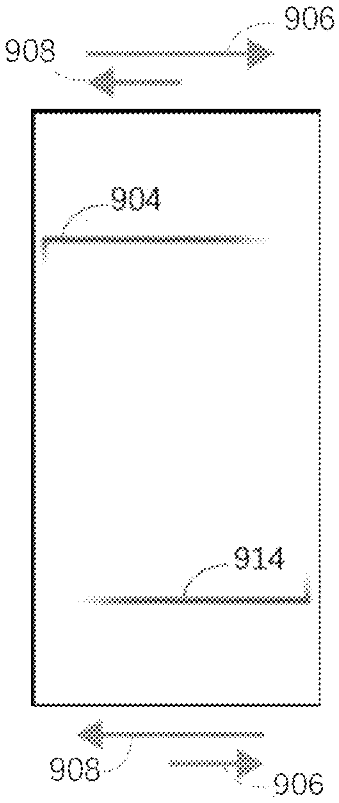
Figure 9B:
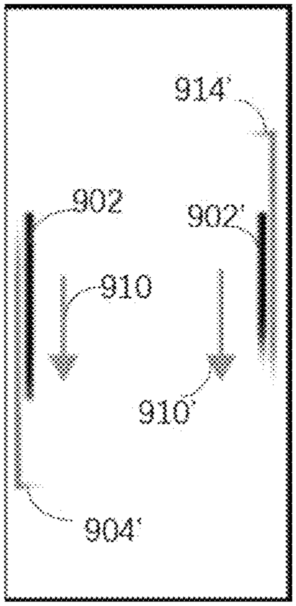

In one or more examples, light elements can be designed to achieve light actions such as longitudinal and/or transverse motion in up, down, left and right directions. For example, as shown in FIG. 7, the light of the side elements 702 and 702' on both sides can be expanded or extinguished upward as indicated by an arrow 704 and/or downward as indicated by an arrow 706. For another example, in three frames successively shown in FIG. 8A to FIG. 8C, first, along the downward direction indicated by an arrow 802, first a part 812 of the upper part of the light of the 8-shaped element in the first frame shown in FIG. 8A appears from top to bottom, then a part 814 of the middle part of the light of the 8-shaped element in the second frame shown in FIG. 8B is displayed from top to bottom, and then a part 816 of the lower part of the light of the 8-shaped element in the third frame shown in FIG. 8C is displayed from top to bottom; and then, the upward direction indicated by an arrow 804 can be changed, first a part 816 of the lower part of the light of the 8-shaped element appears from bottom to top, and then a part 814 of the middle part and a part 812 of the upper part are displayed successively from bottom to top, so that the 8-shaped element is displayed in a manner of moving up and down in a longitudinal direction.

The light action of the longitudinal and/or transverse motion of the light elements can also be designed to achieve, for example, an action in which the light flows like current flows through a wire, or an action in which the light streaks across the sky like a shooting star. As shown in two frames that can be repeatedly displayed at intervals in FIG. 9A and FIG. 9B, in the first frame in FIG. 9A, the light of upper and lower parts 904 and 914 of the edge element first move in the directions indicated by transverse arrows 906 and 908 to create an action effect like the light flowing along the edge of the housing of the music visualization apparatus; and then, in the second frame, while the edge element flows in left and right parts 904' and 914', the light of side elements 902 and 902' is added and streaks downward as indicated by longitudinal arrows 910 and 910' respectively to create an action effect like a shooting star streaking across the sky.

Figure 10A:
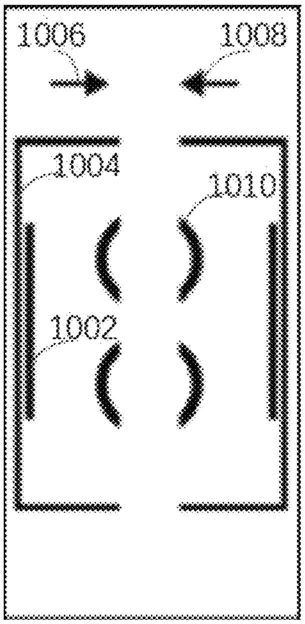
Figure 10B:
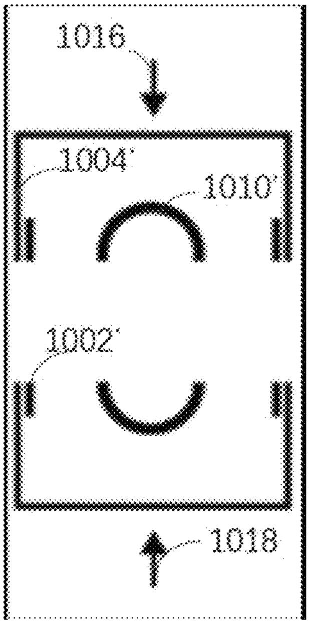
Figure 11A:
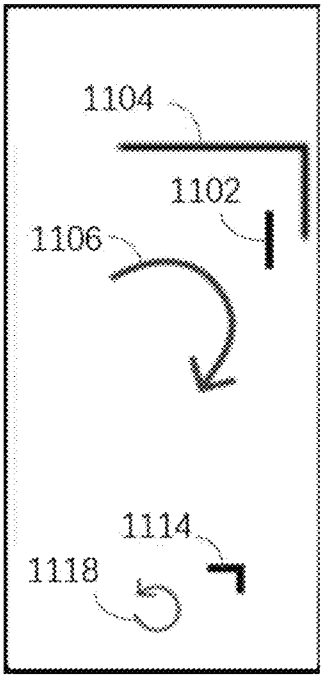
FIG. 11A to FIG. 11B show schematic diagrams of designing a light element to achieve a light action of a rotary motion according to one or more embodiments of the disclosed subject matter.
Figure 11B:
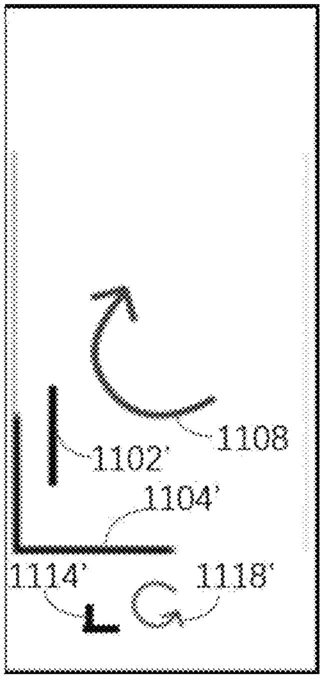

Furthermore, the longitudinal and/or transverse motion of the light elements can also be designed to achieve light actions, for example, closing or opening of a gate. For example, as shown in FIG. 10A and FIG. 10B respectively, in FIG. 10A, the combined light including side elements 1002, edge elements 1004 and 8-shaped elements 1010 appears from left and right directions and is expanded in the middle as indicated by arrows 1006 and 1008 to create an effect of gate closing. For another example, as shown in FIG. 10B, the combined light including side elements 1002', edge elements 1004' and 8-shaped elements 1010' appears from up and down directions and is expanded in the middle as indicated by arrows 1016 and 1018 to create another effect of gate closing. It is conceivable that such a combination of pattern elements is cut in the middle and gradually disappears in up and down directions or left and right directions, that is, opposite to the motion directions indicated by the arrows in FIG. 10A and FIG. 10B, so as to respectively show the effect of gate opening.

In one or more examples, light elements can be designed to achieve light actions such as rotary motion. For example, as shown in two frames that can be displayed successively in FIG. 11A and FIG. 11B, in the first frame in FIG. 11A, a part of the side element 1102 and a part of the edge element 1104 rotate together 360 degrees in the clockwise direction indicated by an arrow 1106, and the projection element 1114 rotates 360 degrees in the counterclockwise direction indicated by an arrow 1118; and with the arrival of the next beat of the music, it changes to the second frame in FIG. 11B, where a part of the side element 1102' and a part of the edge element 1104' both rotate 360 degrees in the counterclockwise direction indicated by an arrow 1108, while the projection element 1114 still rotates 360 degrees in the counterclockwise direction indicated by an arrow 1118'.

Figure 12A:
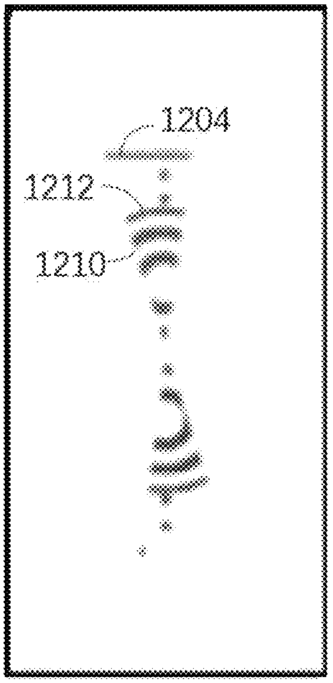
FIG. 12A to FIG. 12C show schematic diagrams of designing a light element to achieve a light action of another rotary motion according to one or more embodiments of the disclosed subject matter.
Figure 12B:
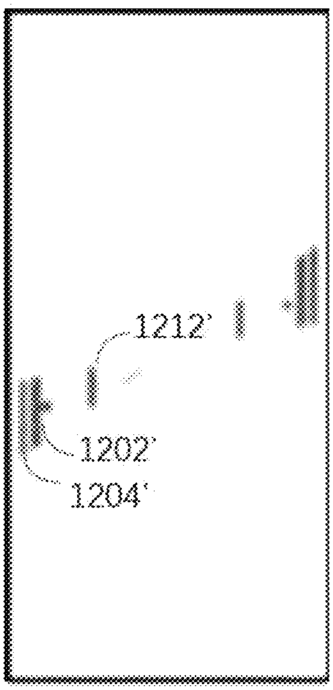
Figure 12C:
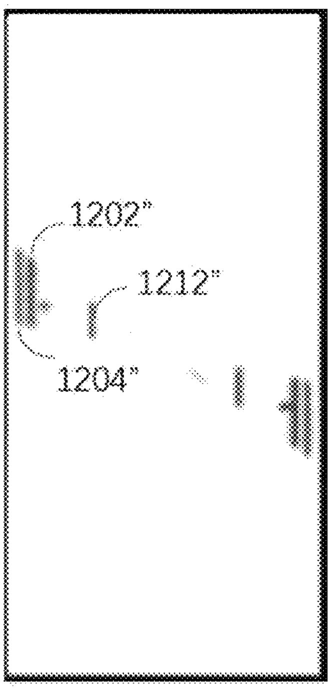

For another example, as shown in three frames that can be displayed sequentially in FIG. 12A, FIG. 12B, and FIG. 12C, in the first frame shown in FIG. 12A, side elements 1202, edge elements 1204, 8-shaped elements 1210 and 8-shaped outline elements 1212 are respectively combined in two diagonal parts, and the light rotates around the center of the front panel of the music visualization apparatus like a wheel hub; in the second frame shown in FIG. 12B, side elements 1202', edge elements 1204', 8-shaped elements 1210' and 8-shaped outline elements 1212' already rotate about 45 degrees counterclockwise at the same angular speed; and in the third frame shown in FIG. 12C, side elements 1202", edge elements 1204", 8-shaped elements 1210" and 8-shaped outline elements 1212" already rotate half a circle at the same time, so as to create an effect like wheel rotation.

In addition, light elements can also be designed separately or in combination to create more diverse actions, such as waveform motion and radial motion. Various action effects achieved by lights are not limited to the examples listed herein, but also include other examples that do not depart from the scope of the disclosed subject matter.

It is understandable that by designing the light elements separately or in combination, a variety of light show actions are achieved and may include but are not limited to various examples described above. The design of these light elements within a framework may generally include: causing the light elements to change according to the detected information of the music mode, and/or causing the light elements to change synchronously or asynchronously with beats of the light show.

Specifically, first, simple cyclic light motion data can change linearly with the speed of music beats, for example, the simple cyclic light motion data can be updated every 2 s according to the speed of music beats. Then, the simple cyclic light motion data can be accelerated or decelerated as long as changes in beats are detected. In addition, when a certain number of beats are detected (such as usually 1 to 4 beats), a single light component or a group of light components can collide with each other (i.e., simultaneously) or can be switched (such as rotated) to present light changes. In one or more embodiments according to the disclosed subject matter, the cyclic motion of light elements and changes thereof according to music modes and beats can be arranged and combined in different proportions based on different light pattern designs, thereby forming more and more complex light changes.

In one or more examples, when the music reaches a very high intensity, for certain modes (such as the mode 4), the light show pattern can be set to have a fixed motion speed so it can maintain a rapid cycle and does not need to be synchronized with beats. This flexible definition can help optimize the music visualization of the light show to a further level.

In one or more other examples, the display of light elements may have a hierarchical structure. For example, the lower the level of the music mode, the fewer light elements may be included in the light show. Furthermore, in actions that combine multiple light elements, various light element types may be synchronized with beats of the music in the manner described above. Alternatively, the light elements may also be designed and changed to be not synchronized with beats of the music.

In order to enrich the visual language of the light show, various light action styles are used in the disclosed subject matter, where these different light show styles may be referred to as "different light show patterns", and the output of the music mode detection neural network may be mapped to one or more of these light show patterns respectively. Each light show pattern may include multiple light actions respectively. For example, during the same music mode playing time, each light show pattern will be randomly played and changed between different actions according to the music mode detected by the music mode detection neural network, thereby forming a variety of dynamic light patterns. These light actions can be defined as belonging to this light show pattern.

In one or more embodiments of the disclosed subject matter, one or more of these light elements can form at least six light motion patterns according to different dynamic designs. These light motion patterns include, for example, Bounce, Neon, Trim, Switch, Loop, Freeze, etc. Each light motion pattern starts from the corresponding default initial color, and the color can be continuously and cyclically changed within a certain color change range. Each pattern has a combination of multiple light actions according to different music. The one or more light components arranged on the music visualization apparatus can be controlled by the control unit to display various light show patterns according to the music modes received by the control unit. For example, the combination and light action of one or more light elements can be displayed in a controlled manner. For example, the color, brightness and/or switch of one or more light actions can be displayed in a controlled manner to achieve changes in various light effects. In some examples, the light components can be controlled by the control unit to display and change light show motion patterns based on the time interval for receiving the detection results of music modes. In some examples, each action pattern includes different light element combinations, and the duration of each combination can be set to a maximum of, for example, 15 s. That is to say, even if a certain music mode is not changed to the next music mode after 15 s, the light action pattern of the light show will be switched to another combination of this mode.

The following table summarizes various combination examples of some exemplary light action patterns, and the detection results (such as modes 1 to 4) outputted by the music mode detection neural network can be mapped to these light action patterns. The detection results (such as modes 1 to 4) outputted by the music mode detection neural network can be mapped to one or more light action combinations in these light action patterns. Each light action pattern may have, for example, an initial default light color, and these light colors may change as the light action pattern changes. It is conceivable that the light action patterns and various changes designed and used in actual light shows are not limited thereto and do not depart from the scope of the disclosed subject matter.

For the Bounce light motion pattern, for a song having, for example, four music modes 1 to 4, four combinations C1 to C4 of dynamic light changes included therein can be summarized as described in the following Table 1:

TABLE 1

Light action combination of Bounce light motion pattern
Bounce light motion pattern Default color: turquoise

| Music mode | Combination | | | |
|---|---|---|---|---|
| | First combination C1 | Second combination C2 | Third combination C3 | Fourth combination C4 |
| Mode 1 | The 8-shaped elements swing left and right like a windshield wiper with each beat of the music. | | | |
| Mode 2 | The 8-shaped elements move up and down with each beat of the music. | The 8-shaped elements swing left and right like a windshield wiper with each beat of the music; and upper and lower circles of the FIG. 8 move in opposite directions for at least 4 circles, and mode changes are ignored. | | |
| | The side elements move up and down with each beat of the music. | The side elements streak in opposite directions up and down with each beat of the music. | | |
| | The strobe elements flash randomly one by one. | The strobe elements flash randomly one by one. | | |
| Mode 3 | The 8-shaped elements swing left and right like a windshield wiper with each beat of the music. | The side elements and edge elements move transversely left and right and vertically up and down with beats. | The 8-shaped elements and side elements move up and down for at least two rounds. | The data of the fourth combination C4 in the mode 3 lasts for at least 6 cycles. |
| | The side elements streak in opposite directions up and down with each beat of the music; and | The 8-shaped elements move up and down with beats, and the strobe elements flash randomly one by one with the | The edge elements and projection elements flash with beats. The strobe elements flash | |

TABLE 1-continued

| Light action combination of Bounce light motion pattern<br>Bounce light motion pattern Default color: turquoise | | | | |
|---|---|---|---|---|
| | Combination | | | |
| Music mode | First combination C1 | Second combination C2 | Third combination C3 | Fourth combination C4 |
| | colored projection elements rotate with beats. | light becoming brighter on heavy beats of the music. | randomly one by one with the light becoming brighter on heavy beats of the music. | |
| | The star elements move up and down.<br>The edge elements and strobe elements flash randomly one by one with the light becoming brighter on heavy beats of the music. | The projection elements move up and down with beats. | The 8-shaped elements last for 4 beats in the second and third frames and last for 1 beat in the first and fourth frames, and the 8-shaped ambiguity is reduced to 0% when the first and fourth frames appear. | |
| Mode 4 | Very fast second combination C2 in the mode 3<br>The strobe elements flash with beats, the projection elements rotate with beats, and the two change in sequence.<br>Star elements moving randomly | | | |

For the Neon light motion pattern, for a song having, for example, four music modes 1 to 4, three combinations C1 to C3 of dynamic light changes included therein can be summarized as described in the following Table 2:

TABLE 2

| Light action combination of Neon light motion pattern<br>Neon light motion pattern Default color: Mixing of multiple colors | | | |
|---|---|---|---|
| | Combination | | |
| Music mode | First combination C1 | Second combination C2 | Third combination C3 |
| Mode 1 | The 8-shaped elements with colors changing in pairs circularly rotate in a circle at a constant speed.<br>The edge elements and side elements move in a current mode when the music is detected. | | |
| Mode 2 | The 8-shaped outline elements with 2 colors are switched with a beat sequence, the first frame lasts for 2 beats, and random stars change motion directions every 3 s in a wave shape. | The edge elements, 8-shaped outline elements, side elements and 8-shaped elements rotate step by step in a wheel shape. During the second combination C2 in the mode 3, if the mode level changes to the mode 2, the second combination C2 in the mode 2 is not displayed but the first combination C1 or C4 in the mode 2 is displayed for at least 4 cycles. | The 8-shaped elements, side elements and edge elements are switched between two colors. |

TABLE 2-continued

| Light action combination of Neon light motion pattern<br>Neon light motion pattern Default color: Mixing of multiple colors | | | |
|---|---|---|---|
| | Combination | | |
| Music mode | First combination C1 | Second combination C2 | Third combination C3 |
| | | The strobe elements flash randomly one by one. | |
| Mode 3 | Three circles included in an 8 shape and an outer ring are switched with beats. The edge elements, side elements and 8-shaped elements rotate in a wheel shape. Random star elements are accelerated when the music saturation is higher than a threshold. The projection elements rotate with beats, and the strobe elements flash randomly one by one with the light becoming brighter on heavy beats of the music. | The edge elements, side elements, 8-shaped elements and 8-shaped outline elements all rotate twice in a wheel shape for at least 8 cycles. The strobe elements flash randomly one by one with the light becoming brighter on heavy beats of the music. | |
| Mode 4 | When the music saturation is higher than the threshold, the vertical color stripes of the edge elements, side elements, 8-shaped elements and projection elements change very quickly. The star elements change randomly. The projection elements and strobe elements flash one by one with the light becoming brighter on heavy beats of the music. | | |

For the Switch light motion pattern, for a song having, for example, four music modes 1 to 4, four combinations C1 to C4 of dynamic light changes included therein can be summarized as described in the following Table 3:

TABLE 3

| Light action combination of Switch light motion pattern<br>Switch light motion pattern Default color: black | | | | |
|---|---|---|---|---|
| | Combination | | | |
| Music mode | First combination C1 | Second combination C2 | Third combination C3 | Fourth combination C4 |
| Mode 1 | The edge elements, 8-shaped elements, side elements and 8-shaped outline elements are switched every two beats. | | | |
| Mode 2 | The edge elements, 8-shaped elements, side elements and 8-shaped outline elements are switched every two beats. | | | |
| Mode 3 | All sides of the edge elements and side elements are switched with beats, and operate clockwise with the star elements. | The star elements, side elements, edge elements, rings, 8-shaped outline elements, side elements, edge elements and | The edge elements, 8-shaped elements, side elements and 8-shaped outline elements are quickly switched without beat detection, and the 8-shaped elements and 8-shaped | The data of the fourth combination C4 in the mode 3 and the strobe elements flashing |

TABLE 3-continued

| Light action combination of Switch light motion pattern<br>Switch light motion pattern Default color: black | | | | |
|---|---|---|---|---|
| | Combination | | | |
| Music mode | First combination C1 | Second combination C2 | Third combination C3 | Fourth combination C4 |
| | The strobe elements flash quickly one by one from left to right, and the projection elements rotate quickly. | projection elements take 3 frames per beat. The strobe elements flash randomly one by one with the light becoming brighter on heavy beats of the music. | outline elements need to be displayed at intervals actually. The strobe elements and projection elements flash with beats. | randomly one by one are switched. |
| Mode 4 | The edge elements, 8-shaped elements, side elements and 8-shaped outline elements are switched quickly. The star elements in the second combination C2 in the mode 3 operate in a circle. The projection elements and strobe elements flash, and the light becomes brighter on the 1st, 3rd and 5th beats. | | | |

For the Trim light motion pattern, for a song having, for example, four music modes 1 to 4, three combinations C1 to C3 of dynamic light changes included therein can be summarized as described in the following Table 4:

TABLE 4

| Light action combination of Trim light motion pattern<br>Trim light motion pattern Default color: orange | | | |
|---|---|---|---|
| | Combination | | |
| Music mode | First combination C1 | Second combination C2 | Third combination C3 |
| Mode 1 | The edge elements, side elements and 8-shaped elements move in a circular radiation wave pattern. | The 8-shaped elements rotate symmetrically in a circle. | |
| Mode 2 | When the music saturation is higher than a threshold, the speed increases, and the edge elements, side elements and 8-shaped elements are trimmed transversely and vertically to form gate opening and closing motion. The projection elements and strobe elements flash, and the light becomes brighter on the first, third and fifth beats. | | |
| Mode 3 | The edge elements, side elements, 8-shaped elements, star elements, 8-shaped outline elements and projection elements are completely trimmed off, the first frame of the projection element moves with the data, and the second and third frames of the | When the music saturation is higher than a threshold, the speed increases, and the edge elements, side elements and 8-shaped elements are trimmed transversely and vertically to form gate opening and closing motion. | |

TABLE 4-continued

| Light action combination of Trim light motion pattern<br>Trim light motion pattern Default color: orange | | | |
|---|---|---|---|
| | Combination | | |
| Music mode | First combination C1 | Second combination C2 | Third combination C3 |
| | projection element move with beats. | When the music saturation is higher than the threshold, the star elements move randomly. | |
| | The strobe elements flash randomly one by one. | The projection elements and strobe elements flash randomly one by one with the light becoming brighter on heavy beats of the music. | |
| Mode 4 | Only after another full frame is displayed, the edge elements, side elements, 8-shaped elements, star elements, 8-shaped outline elements and strobe elements flow quickly to both sides, which is repeated twice. | | |

For the Loop light motion pattern, for a song having, for example, four music modes 1 to 4, three combinations C1 to C3 of dynamic light changes included therein can be summarized as described in the following Table 5:

TABLE 5

| Light action combination of Loop light motion pattern<br>Loop light motion pattern Default color: purple | | | |
|---|---|---|---|
| | Combination | | |
| Music mode | First combination C1 | Second combination C2 | Third combination C3 |
| Mode 1 | The 8-shaped elements rotate 360 degrees with beats slowly in a circle along an 8-shaped trajectory. | | |
| Mode 2 | The 8-shaped elements rotate 360 degrees with beats in a circle.<br>The side elements move up and down in opposite directions with beats.<br>The strobe elements flash randomly one by one.<br>The projection elements flash, and rotate once and then 8 times. | | |
| Mode 3 | The data of the first combination C1 in the cyclic mode 3<br>and<br>the strobe elements flash randomly one by one with the light becoming brighter on heavy beats of the music. | The 8-shaped elements, side elements and edge elements rotate/flow 360 degrees with beats.<br>The side elements, edge elements and projection elements rotate with beats.<br>The strobe elements flash randomly one by one with the light becoming brighter on heavy beats of the music. | |

TABLE 5-continued

| Light action combination of Loop light motion pattern<br>Loop light motion pattern Default color: purple | | | |
|---|---|---|---|
| | Combination | | |
| Music mode | First combination C1 | Second combination C2 | Third combination C3 |
| Mode 4 | The 8-shaped elements, side elements and edge elements rotate quickly, and change directions every 2 beats.<br>The star elements rotate randomly.<br>The side elements, edge elements and projection elements rotate, and the strobe elements flash randomly one by one with the light becoming brighter on heavy beats of the music. | | |

For the Freeze light motion pattern, for all music modes, a combination C1 of dynamic light changes included therein can be summarized as described in the following Table 6:

TABLE 6

| Light action combination of Freeze light motion pattern<br>Freeze light motion pattern Default color: yellow | | | |
|---|---|---|---|
| | Combination | | |
| Music mode | First combination C1 | Second combination C2 | Third combination C3 |
| Mode 1 | The 8-shaped elements, edge elements and side elements statically present 100% brightness. | | |

The music visualization apparatus for light shows provided by the disclosed subject matter generally can be based on the music change, and can adjust light patterns accordingly through the perception of the external environment and/or the body posture of a user to match the change of the light. In the light show that matches the music change and environmental characteristics, the apparatus can use various lights of different colors, intensities and shapes to create a variety of different atmospheres and scenes of light changing, flashing, jumping, etc., thereby conveying the harmonious unity between light and people, light and environment, and light and atmosphere.

Examples of one or more implementations of the disclosed subject matter are described in the following clauses:

Clause 1. A music visualization method for light shows, including the following steps:

constructing, by a music mode detection neural network unit, a music mode detection neural network;

inputting a song to be played into the music mode detection neural network for detection based on time intervals to detect the song as one of multiple music modes at each of the time intervals; and receiving, by a control unit, detection results of the music modes in the song to be played from the music mode detection neural network unit and controlling light components to display at least one of multiple light show patterns correspondingly while playing the song.

Clause 2. The method of clause 1, wherein the method further comprises the step of training the music mode detection neural network to obtain a combination of judgment standards for key music representatives of each of the multiple music modes.

Clause 3. The method of clause 1 to clause 2, wherein the music mode detection neural network is trained by using song samples whose individual clips have been artificially defined as known music modes, and the known music mode is one of the multiple music modes.

Clause 4. The method of any one of clause 1 to clause 3, wherein the key music representative comprises at least one of the following: low attack speed, low attack intensity, high attack speed, high attack intensity, bass level, instrument diversity, vocal speed, and vocal intensity.

Clause 5. The method of any one of clause 1 to clause 4, wherein the control unit dynamically updates the displayed at least one of the multiple light show patterns based on the detection result of the music mode of the song received in real time from the music mode detection neural network unit at each of the time intervals while playing the song.

Clause 6. The method of any one of clause 1 to clause 5, wherein each of the multiple light show patterns is designed according to one or more of the multiple music modes.

Clause 7. The method of any one of clause 1 to clause 6, wherein each of the multiple light show patterns comprises at least one combination of light actions.

Clause 8. The method of any one of clause 1 to clause 7, wherein at least one of the multiple light show patterns comprises at least one of the following: Bounce, Neon, Trim, Switch, Loop, and Freeze.

Clause 9. The method of any one of clause 1 to clause 8, wherein the at least one combination of light actions changes according to beats of the song.

Clause 10. The method of any one of clause 1 to clause 3, wherein the at least one combination of light actions changes according to a duration of the music mode of the song.

Clause 11. A music visualization apparatus for light shows, comprising:

a music mode detection neural network unit configured to construct a music mode detection neural network, wherein a song to be played is inputted into the music mode detection neural network for detection based on time intervals to detect the song as one of multiple music modes at each of the time intervals;

a control unit configured to receive detection results of the music modes in the song from the music mode detection neural network unit; and light components configured to be dynamically controlled by the control unit to display at least one of multiple light show patterns correspondingly while playing each of the clips of the song.

Clause 12. The apparatus of clause 11, wherein the music mode detection neural network unit is further configured to recognize each of the time intervals of the song as one of the multiple music modes according to key music representatives.

Clause 13. The apparatus of any one of clause 11 to clause 12, wherein the key music representative comprises at least one of the following: low attack speed, low attack intensity, high attack speed, high attack intensity, bass level, instrument diversity, vocal speed, and vocal intensity.

Clause 14. The apparatus of any one of clause 11 to clause 13, wherein the control unit dynamically updates the displayed at least one of the multiple light show patterns based on the detection result of the music mode of the song received in real time from the music mode detection neural network unit at each of the time intervals while the song is played.

Clause 15. The apparatus of any one of clause 11 to clause 14, wherein the light components are set to be mapped as multiple light elements in combination.

Clause 16. The apparatus of any one of clause 11 to clause 15, wherein each of the multiple light elements comprises at least one of the following: a side element, an edge element, a star element, a strobe element, an 8-shaped element, an 8-shaped outline element, a projection element and a top panel element.

Clause 17. The apparatus of any one of clause 11 to clause 16, wherein the multiple light elements are designed to achieve each of multiple light actions.

Clause 18. The apparatus of any one of clause 11 to clause 17, wherein at least one of the multiple light show patterns is designed according to one or more of the multiple music modes.

Clause 19. The apparatus of any one of clause 11 to clause 18, wherein at least one of the multiple light show patterns comprises at least one combination of light actions.

Clause 20. The apparatus of any one of clause 11 to clause 19, wherein at least one of the multiple light show patterns comprises at least one of the following: Bounce, Neon, Trim, Switch, Loop, and Freeze.

Clause 21. The apparatus of any one of clause 11 to clause 20, wherein the at least one combination of light actions changes according to beats of the song.

Clause 22. The apparatus of any one of clause 11 to clause 21, wherein the at least one combination of light actions changes according to a duration of the music mode of each of the clips of the song.

Clause 23. A non-temporary computer-readable medium storing instructions, the instructions, when executed by one or more processors, causing the one or more processors to execute the music visualization method for light shows of clauses 1 to 10.

The selection of terms used herein is intended to best explain the principles and practical applications of the embodiments or the improvements to technologies found in the market, or to enable other persons of ordinary skill in the art to understand the embodiments disclosed herein.

In the above, reference is made to the embodiments presented in the present disclosure. However, the scope of the present disclosure is not limited to the specifically described embodiments. Rather, any combination of the above features and elements, whether related to different embodiments or not, is contemplated as implementing and practicing the contemplated embodiments.

Furthermore, although the embodiments disclosed herein can achieve advantages better than other possible solutions or better than the prior art, whether a given embodiment achieves specific advantages does not limit the scope of the present disclosure. Therefore, the above aspects, features, embodiments and advantages are merely illustrative and are not considered as elements or limitations of the appended claims unless explicitly recited in the claims.

Although the above content is directed to the embodiments of the present disclosure, other and further embodiments of the present disclosure can be designed without departing from the basic scope of the present disclosure, and the scope of the present disclosure is determined by the appended claims.

What is claimed is:

1. A music visualization method for light shows, the method comprising:

constructing, by a music mode detection neural network unit, a music mode detection neural network;

inputting a song to be played into the music mode detection neural network for detection based on time intervals to detect the song as one of multiple music modes at each of the time intervals; and receiving, by a control unit, detection results of the music modes in the song from the music mode detection neural network unit, and dynamically controlling light components to display at least one of multiple light show patterns while playing the song, wherein a first interval of the song corresponds to a first light show pattern, and a second interval of the song corresponds to a second light show pattern, wherein the dynamically controlling light components includes:

displaying the first light show pattern while playing the first interval, responsive to detecting arriving at the second interval, switching to display the second light show pattern, and responsive to detecting the second interval is still being played after a duration threshold, switching to display a third light show pattern while continuing to play the second interval.

2. The method of claim 1 further comprising training the music mode detection neural network to obtain a combination of judgment standards for key music representatives of each of the multiple music modes.

3. The method of claim 2 further comprising training the music mode detection neural network unit by using song samples whose individual clips have been artificially defined as known music modes, and a known music mode is one of the multiple music modes.

4. The method of claim 2, wherein the key music representative comprises at least one of the following: low attack speed, low attack intensity, high attack speed, high attack intensity, bass level, instrument diversity, vocal speed, and vocal intensity.

5. The method of claim 2 further comprising dynamically updating by the control unit the displayed at least one of the multiple light show patterns based on the music mode of the song received in real time from the music mode detection neural network unit at each of the time intervals while playing the song.

6. The method of claim 1, wherein at least one of the multiple light show patterns is designed according to one or more of the multiple music modes.

7. The method of claim 6, wherein at least one of the multiple light show patterns comprises at least one combination of light actions.

8. The method of claim 6, wherein at least one of the multiple light show patterns comprises at least one of the following: Bounce, Neon, Trim, Switch, Loop, and Freeze.

9. The method of claim 7, wherein the at least one combination of light actions changes according to beats of the song.

10. The method of claim 7, wherein the at least one combination of light actions changes according to a duration of the music mode of the song.

11. A music visualization apparatus for light shows, comprising:

- a music mode detection neural network unit configured to construct a music mode detection neural network, wherein a song to be played is inputted into the music mode detection neural network for detection based on time intervals to detect the song as one of multiple music modes at each of the time intervals;
- a control unit configured to receive detection results of the music modes in the song from the music mode detection neural network unit; and
- light components configured to be dynamically controlled by the control unit to display at least one of multiple light show patterns correspondingly while the song is played, wherein a first interval of the song corresponds to a first light show pattern, and a second interval of the song corresponds to a second light show pattern,
- the light components are further configured to:
  - display the first light show pattern while playing the first interval,
  - responsive to detecting arriving at the second interval, switch to display the second light show pattern, and
  - responsive to detecting the second interval is still being played after a duration threshold, switch to display a third light show pattern while continuing to play the second interval.

12. The apparatus of claim 11, wherein the music mode detection neural network unit is further configured to recognize each of the time intervals of the song as one of the multiple music modes according to key music representatives.

13. The apparatus of claim 12, wherein the key music representatives comprise at least one of the following: low attack speed, low attack intensity, high attack speed, high attack intensity, bass level, instrument diversity, vocal speed, and vocal intensity.

14. The apparatus of claim 11, wherein the control unit dynamically updates the displayed at least one of the multiple light show patterns based on the music mode of the song received in real time from the music mode detection neural network at each of the time intervals while the song is played.

15. The apparatus of claim 11, wherein the light components are set to be mapped as multiple light elements in combination.

16. The apparatus of claim 15, wherein each of the multiple light elements comprises at least one of the following: a side element, an edge element, a star element, a strobe element, an 8-shaped element, an 8-shaped outline element, a projection element and a top panel element.

17. The apparatus of claim 16, wherein the multiple light elements are designed to achieve each of multiple light actions separately or in combination.

18. The apparatus of claim 11, wherein at least one of the multiple light show patterns is designed according to one or more of the multiple music modes.

19. The apparatus of claim 11, wherein at least one of the multiple light show patterns comprises at least one combination of light actions.

20. The apparatus of claim 11, wherein at least one of the multiple light show patterns comprises at least one of the following: Bounce, Neon, Trim, Switch, Loop, and Freeze.

21. The apparatus of claim 19, wherein the at least one combination of light actions changes according to beats of each of clip of the song.

22. The apparatus of claim 19, wherein the at least one combination of light actions changes according to a duration of the music mode of each clip of the song.

23. A computer-program product embodied in a non-transitory computer readable medium that is programmed and executable by one or more processors to provide music visualization, the computer-program product comprising instructions to:

- construct, by a music mode detection neural network unit, a music mode detection neural network;
- input a song to be played into the music mode detection neural network for detection based on time intervals to detect the song as one of multiple music modes at each of the time intervals; and
- receive, by a control unit, detection results of the music modes in the song from the music mode detection neural network unit, and
- dynamically control light components to display at least one of multiple light show patterns while playing the song, wherein a first interval of the song corresponds to a first light show pattern, a second interval of the song corresponds to a second light show pattern, and the second interval is longer than the first interval,
- wherein the dynamically controlling light components includes:
  - displaying the first light show pattern while playing the first interval,
  - responsive to detecting arriving at the second interval, switching to display the second light show pattern, and
  - switching to display a third light show pattern while second interval is still being played.

* * * * *